US012286607B2

(12) United States Patent
Duval et al.

(10) Patent No.: US 12,286,607 B2

(45) Date of Patent: Apr. 29, 2025

(54) COMPOSITION FOR REMOVING CHEMICAL RESIDUES AND USES THEREOF

(71) Applicant: PREVOR INTERNATIONAL, Paris (FR)

(72) Inventors: Aurélien Duval, Rueil Malmaison (FR); Joël Blomet, Valmondois (FR)

(73) Assignee: PREVOR INTERNATIONAL, Paris (FR)

( * ) Notice: Subject to any disclaimer, the term of this patent is extended or adjusted under 35 U.S.C. 154(b) by 768 days.

(21) Appl. No.: 17/432,209

(22) PCT Filed: Feb. 20, 2020

(86) PCT No.: PCT/FR2020/050319

§ 371 (c)(1),
(2) Date: Aug. 19, 2021

(87) PCT Pub. No.: WO2020/169931

PCT Pub. Date: Aug. 27, 2020

(65) Prior Publication Data

US 2022/0186154 A1 Jun. 16, 2022

(30) Foreign Application Priority Data

Feb. 22, 2019 (FR) ...................................... 1901804

(51) Int. Cl.

*C11D 3/12* (2006.01)
*C11D 3/04* (2006.01)

(Continued)

(52) U.S. Cl.

CPC .............. *C11D 7/3245* (2013.01); *C11D 3/04* (2013.01); *C11D 3/10* (2013.01); *C11D 3/2006* (2013.01); *C11D 3/33* (2013.01); *C11D 2111/20* (2024.01)

(58) Field of Classification Search

CPC ........... C11D 3/04; C11D 3/10; C11D 3/2006; C11D 3/33

(Continued)

(56) References Cited

U.S. PATENT DOCUMENTS

2010/0160201 A1* 6/2010 Scheuing ................ C11D 1/83 510/180
2012/0322712 A1* 12/2012 Yao ..................... C11D 3/3765 510/159

(Continued)

FOREIGN PATENT DOCUMENTS

CL 2007002206 A1 1/2008
CL 52012 B1 2/2012

(Continued)

OTHER PUBLICATIONS

English language machine translation of WO2014013194 (claims).*

(Continued)

*Primary Examiner* — Gregory R Delcotto

(74) *Attorney, Agent, or Firm* — Maier & Maier, PLLC

(57) ABSTRACT

A decontamination composition with at least one primary neutralizing agent and at least one secondary neutralizing agent, for the removal of chemical residues, to a method for employing the composition, and the use of the composition for removing residues on materials, machines, and equipment soiled with chemicals of any type, such as a corrosive product or a chemical containing fluoride ions.

16 Claims, 3 Drawing Sheets

(51) Int. Cl.

| | |
|---|---|
| ***C11D 3/10*** | (2006.01) |
| ***C11D 3/20*** | (2006.01) |
| ***C11D 3/33*** | (2006.01) |
| ***C11D 7/32*** | (2006.01) |

(58) Field of Classification Search

USPC ....... 510/119, 120, 130, 238, 477, 488, 505, 510/506

See application file for complete search history.

(56) References Cited

U.S. PATENT DOCUMENTS

2014/0069466 A1* 3/2014 Silvernail .............. C11D 3/044 134/28
2015/0099685 A1* 4/2015 Silvernail .......... C11D 17/0086 510/362
2016/0186105 A1* 6/2016 Liu ................... H01L 21/31144 510/175
2021/0095227 A1* 4/2021 Lundberg ............. C11D 3/3796
2021/0238505 A1* 8/2021 Liu .......................... C11D 3/10

FOREIGN PATENT DOCUMENTS

CL 2012001409 A1 11/2012
EP 0995492 A1 4/2000
FR 2604900 A1 4/1988
FR 2877232 A1 5/2006
WO WO-2005044287 A1 * 5/2005 ............. A61K 33/24
WO WO-2008015381 A1 * 2/2008 ............... C11D 1/62
WO 2014/013194 A1 1/2014

OTHER PUBLICATIONS

English language machine translation of WO2014013194 (specification).*

International Search Report (with English translation) and Written Opinion (with Machine translation) issued on May 19, 2020 in corresponding International Application No. PCT/FR2020/050319; 15 pages.

* cited by examiner

[Fig. 1]
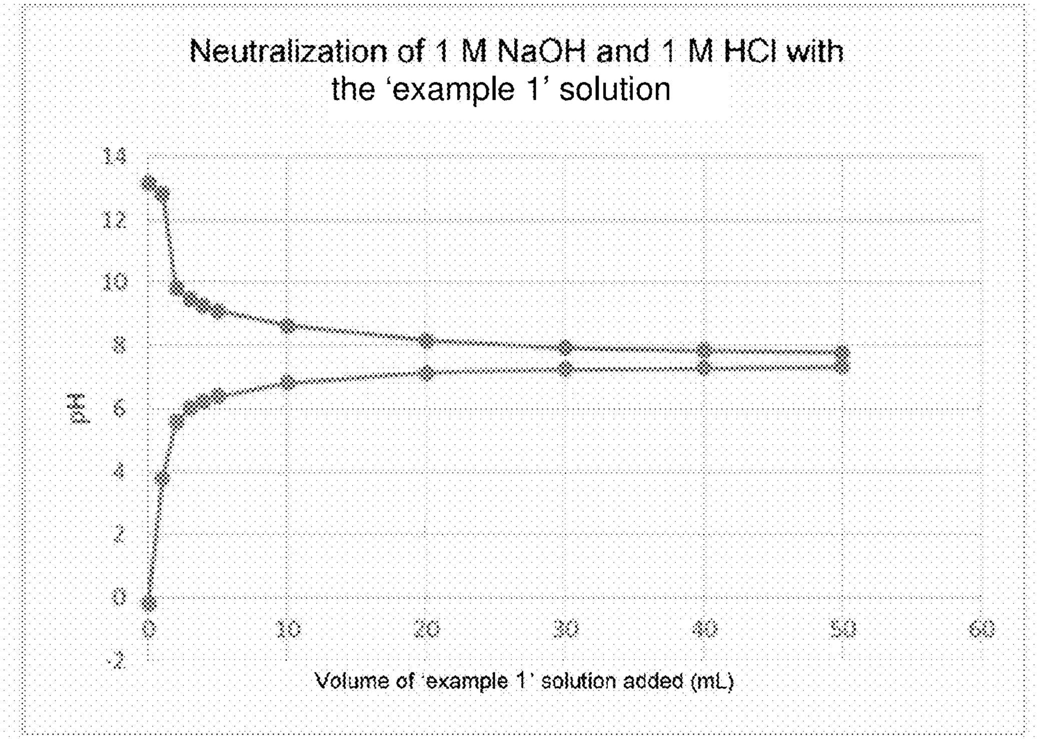
[Fig. 2]
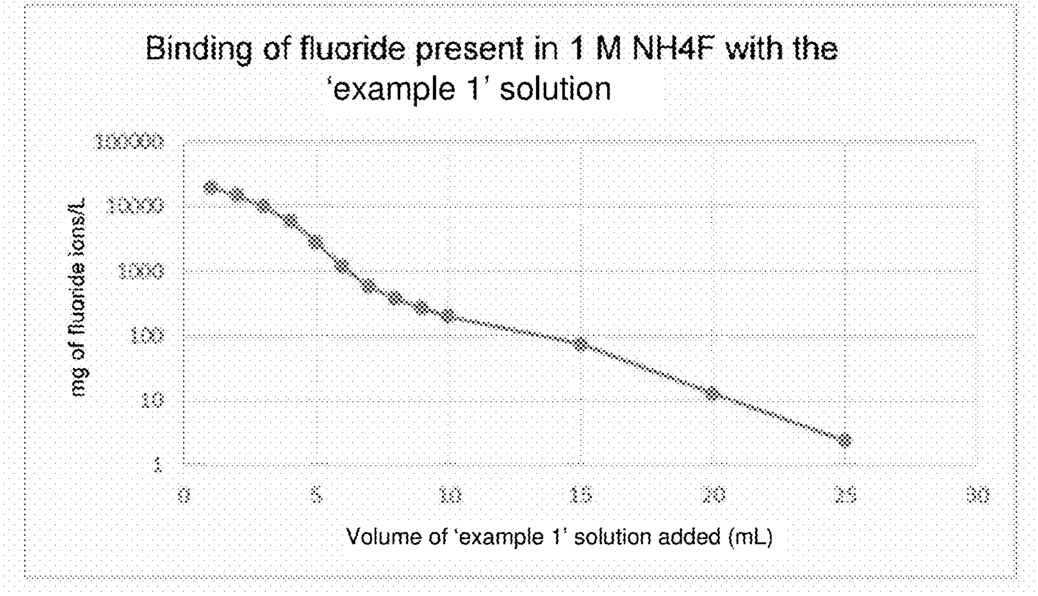

[Fig. 3]
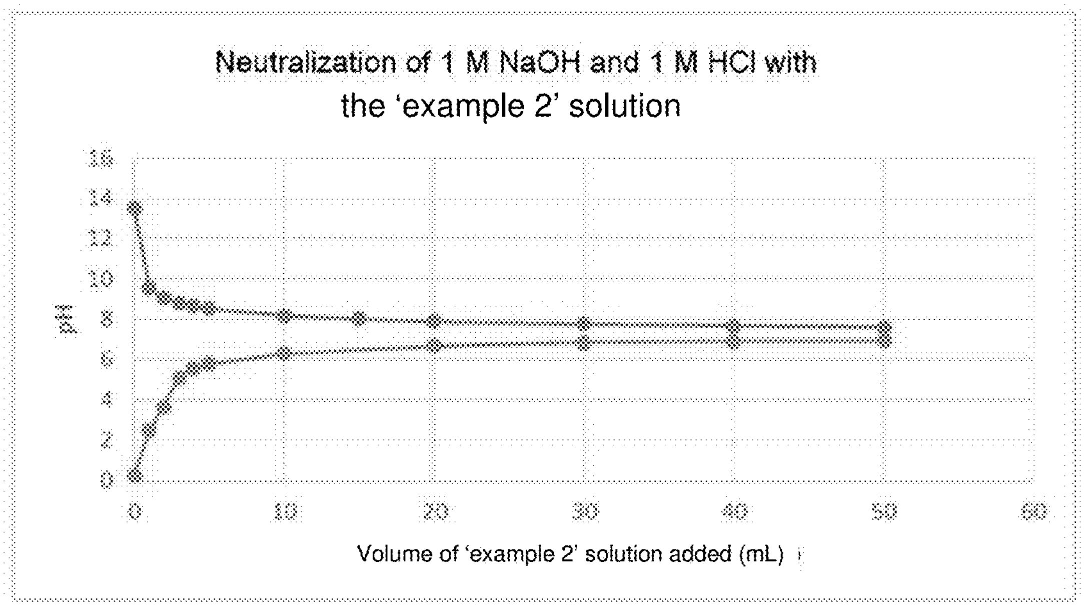
[Fig. 4]
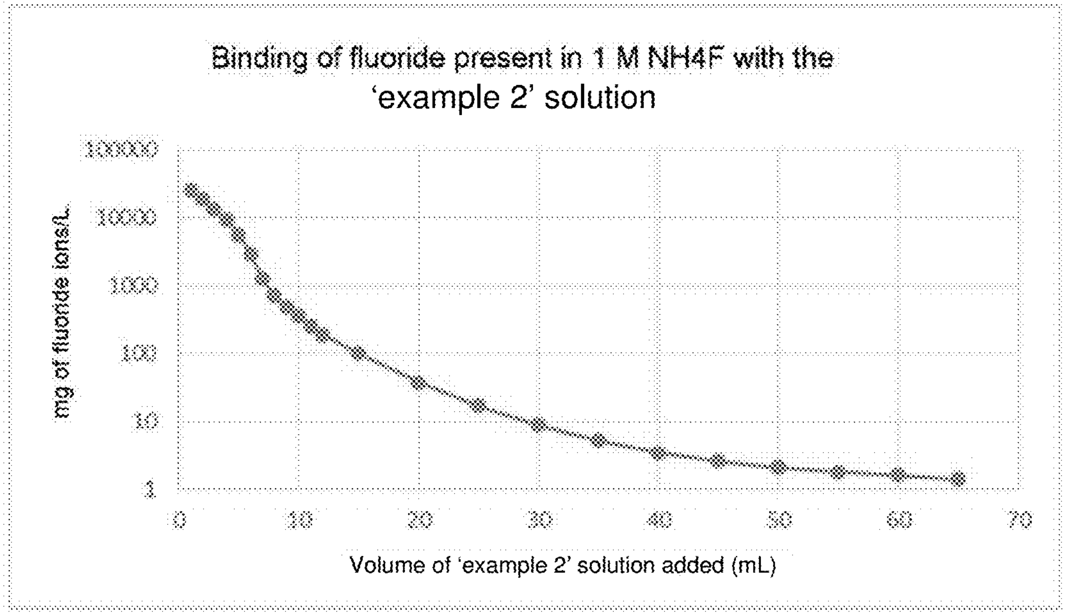

[Fig. 5]
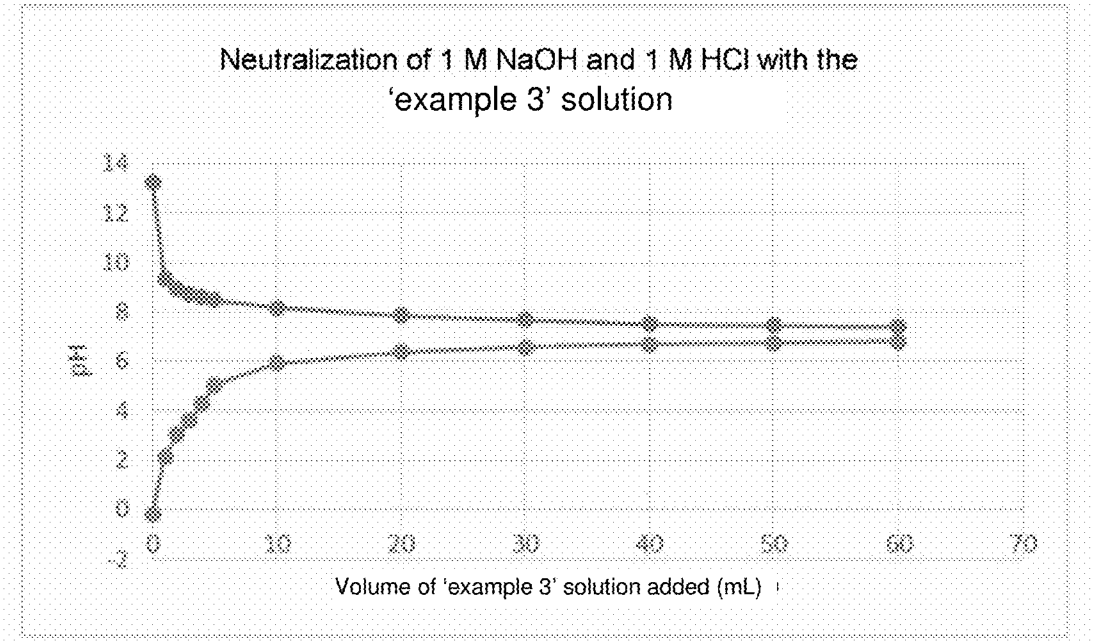
[Fig. 6]
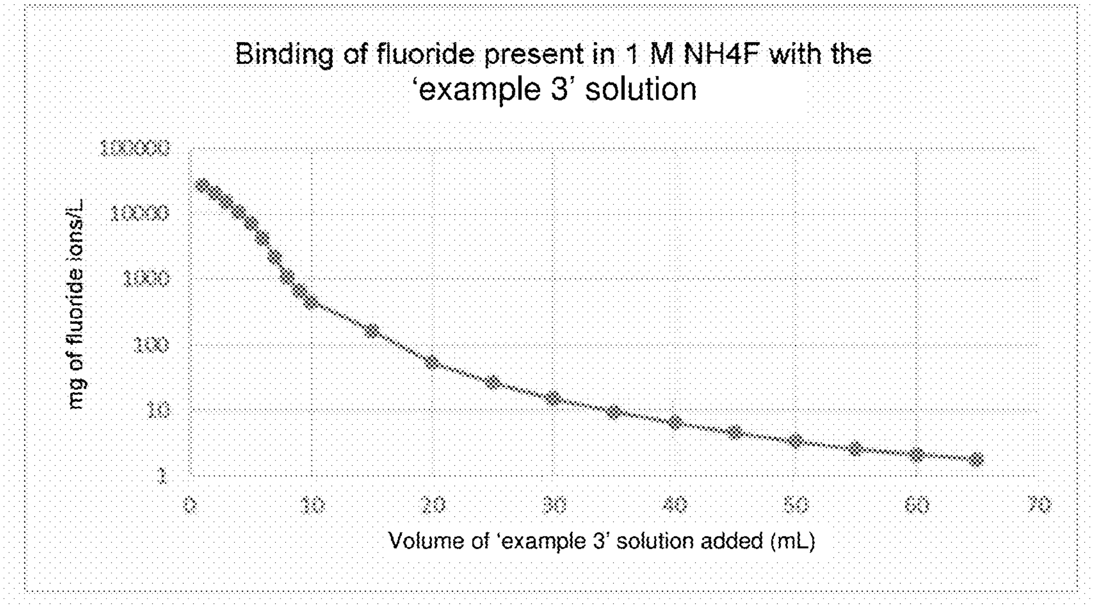

COMPOSITION FOR REMOVING CHEMICAL RESIDUES AND USES THEREOF

FIELD

The present invention relates to a composition for the removal of chemical residues, to a method for employing said composition, and also to the use of said composition for removing residues on materials, machines, and equipment soiled with chemicals of any type.

BACKGROUND

In industry there is thus far no effective solution for decontaminating materials, machines, and/or equipment soiled with chemical contaminants. In the event of a chemical accident during a maintenance operation or during manipulations, splashing with liquids, solids or gases can occur, thus resulting in contamination of the work area and/or of protective equipment. Materials and surfaces in the work area are then soiled by the chemical without this necessarily being visible, thus giving rise not only to risks of chemical injury for workers (skin contact with the chemical or inhalation) but also to risks of corrosion for materials and consequent shortening of the service life thereof.

The use of an absorbent mineral such as diatomaceous earth or sepiolite or of a specialty absorbent such as TRIVOREX® or UNISAFE PH PLUS® makes it possible to neutralize splashes on floors. However, when the contaminated surface is not horizontal but is vertical or uneven (walls, ceilings, machines and protective equipment), it is not possible to use these absorbents.

None of the existing solutions available to those skilled in the art are able to effectively decontaminate said surfaces. Those skilled in the art can either:

- rinse the contaminated surface with water. All this then does is simply to dilute the chemical, for which substantial volumes of water must be used, thereby generating a large volume of hazardous chemical waste.
- use a detergent such as soap and water, a surfactant and water, or a solvent such as acetone or ethanol for entrainment of hydrophobic products. There is therefore no neutralizing chemical activity and the surface is merely rinsed.
- use chemical decontaminants, but the latter have the disadvantage of being specific to one type of chemical and of being corrosive or irritant. Mention may in particular be made of the product NEUTRAL® composed of sodium hydroxide for neutralizing acidic descaling solutions, acidic solutions being able to remove only basic solid residues, the basic (>pH 12) detergent Mucasol® used for cleaning laboratory glassware, or else the decontaminant KolorSafe®, a decontaminant specific for acid that is classed in the category Carcinogenic-Mutagenic-Reprotoxic (CMR).
- use decontaminants in an NRBCE (Nuclear, Radiological, Biological, Chemical, and Explosive) military setting for decontaminating equipment soiled with gases used in warfare, or toxic products such as DES'DEC® Solution R2D2/R2D4 from the company Ouvry or Easydecon DF 200®. However, such decontaminants are sold only in the military sphere and are ineffective for decontaminating corrosive chemicals such as acids or bases, which are omnipresent in industry.
- use a chemical decontaminant for materials: LeVert. This allows acids and bases to be neutralized. Neutralization of acids and bases is understood as meaning ensuring a return of the contaminated surface to a pH of between 5.5 and 9, that is to say a pH at which the acidity or basicity is not deleterious for the body. This product does however have the disadvantage of containing salts that can cause corrosion of certain surfaces or of certain metals such as crude steel. Moreover, this product necessitates the use of an external means of monitoring the pH in order to check the progress of the neutralization (pH paper, pH meter).

When fluoride-based compounds (such as hydrofluoric acid) are spilled or splashed in areas that are difficult to reach, those skilled in the art are faced with an even greater problem. This is because, in addition to eliminating the hazard associated with the corrosiveness of the chemical, it is also necessary to protect against its toxicity. Fluoride poisoning can occur after skin exposure, exposure via the gastrointestinal tract and/or exposure by inhalation. It results in bone, respiratory, and heart disorders that can lead to death. The potentially lethal dose amounts to 5 mg/kg body weight.

None of these solutions mentioned above makes it possible to reduce toxicity from fluoride ions.

A chemical decontaminant for the specific material hydrofluoric acid and derivatives is LeVert HF. The latter makes it possible to decontaminate the surface of soiled materials by restoring the pH of the contaminating chemical to between 5.5 and 9 and by binding fluoride ions. Decontamination is considered to have been effective when the threshold of 1.5 mg/L at which the concentration of fluoride ions becomes non-hazardous has been reached in the decontaminant-fluorochemical mixture. Those skilled in the art must use an external means (test strips for measuring fluoride ions, ion meter) to check that this limit of 1.5 mg of fluoride ions per liter of waste has been achieved. However, the action of the chemical decontaminant LeVert HF is limited to hydrofluoric acid and to other chemical compounds containing fluoride ions and therefore does not permit the effective neutralization of basic chemicals. Such compositions therefore not of universal utility and are unable to indicate when the decontamination operation is complete. Furthermore, such compositions have a high concentration of the salt NaCl, which corrodes metals.

There is accordingly thus far no composition that:

(1) makes it possible to decontaminate and neutralize chemicals of any type, and including hydrofluoric acid and derivatives thereof through the binding of free fluoride ions, (2) does not necessitate an external means of indicating when the acidic/basic decontamination operation is complete, (3) is not hazardous for humans or for the environment (nontoxic, noncorrosive, nonflammable and nonirritant), and (4) is free of salts that could cause metals to corrode.

Nevertheless, the present inventors have had the distinction of finding a decontamination composition that presents an excellent compromise between these different criteria (1) to (4).

SUMMARY

The invention thus relates to a decontamination composition comprising:

- at least one primary neutralizing agent (a) that is a complex based on aluminum and ethylenediaminetetraacetic acid and having a pKa of >4 at least one secondary neutralizing agent (b) selected from an amphoteric agent, the two pKa values of which meet the following conditions:

$$(pKa1+pKa2)/2>5$$

$$7>pKa1>4$$

$$11>pKa2>7$$

and an agent having at least one pKa of between 7 and 11, and mixtures thereof, water, optionally a color indicator or a mixture of color indicators (c), and optionally at least one additive (d), characterized in that said composition is free of salts $H_aX_b$ in which H is an alkali metal or alkaline earth metal, X a halogen atom, a is an integer between 1 and 2, and b is an integer between 1 and 4.

It also relates to a decontamination method employing the composition of the present invention, characterized in that it comprises the following steps:

(1) dispersing the composition on a surface soiled with a chemical, (2) repeating step (1) until a pH of between 5.5 and 9 is obtained, and (3) optionally rinsing with water to prevent colored crystals from appearing during drying of the decontaminated surface.

It also relates to the use of the composition according to the present invention for decontaminating materials, machines, and equipment soiled with chemicals of any type.

DETAILED DESCRIPTION

The invention relates to a decontamination composition comprising:

at least one primary neutralizing agent (a) that is a complex based on aluminum and ethylenediaminetetraacetic acid and having a pKa of >4, at least one secondary neutralizing agent (b) selected from an amphoteric agent, the two pKa values of which meet the following conditions:

$$(pKa1+pKa2)/2>5$$

$$7>pKa1>4$$

$$11>pKa2>7$$

and an agent having at least one pKa of between 7 and 11, and mixtures thereof, water, optionally a color indicator or a mixture of color indicators (c), and optionally at least one additive (d), characterized in that said composition is free of salts $H_aX_b$ in which H is an alkali metal or alkaline earth metal, X a halogen atom, a is an integer between 1 and 2, and b is an integer between 1 and 4.

"Salts $H_aX_b$" is understood as meaning not only salts in molecular form but also particles composed of salts $H_aX_b$ agglomerated together and not dissolved in solution.

Said primary neutralizing agent may be the complex $AlNa_2EDTAOH$.

Said primary neutralizing agent may be present in an amount ranging from 0.1% to 25% by weight, preferably from 10% to 20% by weight, and more preferably from 15% to 18% by weight, relative to the total weight of the composition.

Said secondary neutralizing agent may be selected from ascorbic acid and salts thereof, hydrogen carbonate and salts thereof, creatinine, glutathione, isoguanine, adenine, an amino acid and salts thereof, such as glutamic acid, aspartic acid, arginine, lysine, ornithine, cysteine, and mixtures thereof.

Hydrogen carbonate and salts thereof may be sodium hydrogen carbonate, potassium hydrogen carbonate, ammonium hydrogen carbonate, and mixtures thereof.

Glutamic acid and salts thereof may be glutamate in the form of sodium glutamate, sodium L-glutamate hydrate, and mixtures thereof.

Salts of aspartic acid may be aspartate.

Salts of arginine may be L-arginine monohydrochloride.

Salts of ornithine may be L-ornithine monohydrochloride.

Salts of lysine may be L-lysine hydrochloride.

In one particular embodiment, said secondary neutralizing agent is selected from sodium glutamate, lysine, ornithine, cysteine, and L-arginine.

Said secondary neutralizing agent may be present in an amount ranging from 0.1% to 50% by weight, preferably from 1% to 20% by weight, and more preferably from 5% to 15% by weight, relative to the total weight of the composition.

Examples of additives that may be mentioned are dyes, fragrances, viscosity modifiers, and mixtures thereof.

In one particular embodiment, said color indicator or said mixture of color indicators has a color-change zone at a pH of between 1 and 7, preferably between 2 and 6, and more preferably between 2.5 and 5, and a color-change zone at a pH of between 8 and 13, preferably between 8.5 and 11, and more preferably between 9 and 10.

Color indicators that may be mentioned are methyl red, thymol blue, ethyl orange, methyl orange, tropaeolin OO, bromophenol blue, and mixtures thereof.

The color indicator may be present in an amount ranging from 0% to 5% by weight, preferably ranging from 0.001% to 1% by weight, and more preferably from 0.002% to 0.5% by weight, relative to the total weight of the composition.

The composition of the present invention is free of salts $H_aX_b$, which means it causes little or no corrosion or degradation of surfaces (plastics, metal, glass, etc.) on which it is applied and of metal surfaces in particular, which corrode easily.

In particular, the composition of the present invention is free of at least one compound selected from the salt NaCl, the salt KCl, the salt NaF, and the salt NaBr.

The composition of the invention advantageously comprises:

(a) from 5 to 25%, preferably from 8 to 20%, and more preferably from 10 to 17%, of a primary neutralizing agent, (b) from 1 to 50%, preferably from 5 to 15%, and more preferably from 8 to 13%, of a secondary neutralizing agent, (c) from 0% to 5%, preferably from 0.001% to 1%, and more preferably from 0.002% to 0.5%, of a color indicator or of a mixture of color indicators, (d) water, said percentages being percentages by weight relative to the total weight of the composition.

The present invention also relates to a decontamination method employing the composition of the present invention, characterized in that it comprises the following steps:

(1) dispersing the composition on a surface soiled with a chemical, (2) repeating step (1) until a neutral pH is obtained, preferably until a pH of between 5.5 and 9 is obtained, and (3) optionally rinsing with water to prevent colored crystals from appearing during drying of the decontaminated surface.

In the case where the composition includes a color indicator, step (1) is repeated until a neutral pH is visually obtained, preferably until a pH of between 5.5 and 9 is obtained.

The present invention also relates to the use of the composition of the present invention or as obtained by the method of the present invention for decontaminating materials, machines, and equipment soiled with chemicals of any type.

"Decontaminate" is understood as meaning not only the mechanical entrainment of the polluting chemical but also the neutralization thereof, that is to say:

- restoring the pH of the chemical pollutant-chemical decontaminant mixture to between 5.5 and 9, and
- restoring the level of free fluoride ions in the chemical pollutant-decontaminant mixture to less than 1.5 mg/L when the contaminating chemical is hydrofluoric acid or derivatives thereof.

The contaminating chemical may be a strong base or a strong acid, preferably sodium hydroxide, hydrochloric acid, hydrofluoric acid or derivatives thereof, such as ammonium fluoride or sodium fluoride, or mixtures thereof.

The state of decontamination may be monitored through the presence of a color indicator or of a mixture of color indicators. An external means of checking the acidic/basic decontamination may therefore not be necessary.

The composition according to the present invention can be used to decontaminate materials, machines, and equipment soiled with hydrofluoric acid and derivatives thereof, such as ammonium fluoride or sodium fluoride.

Without being bound by any one theory, the primary neutralizing agent makes it possible to neutralize fluoride ions.

"Neutralize fluoride ions" is understood as meaning preventing their availability and their deleterious action and therefore arresting their toxicity.

The composition of the invention advantageously makes it possible to restore the concentration of free fluoride ions to an acceptable value, that is to say a value of less than 1.5 mg/L.

This threshold corresponds to the maximum permitted fluoride concentration in water for human consumption (WHO, 2004). An individual may consume (by drinking) 2 L per day of water having a concentration of 1.5 mg/L without developing dental fluorosis. Similarly, an individual with skin exposure to a liquid having a fluoride concentration of 1.5 mg/L will not exhibit deleterious effects.

The fluoride ion concentration can be measured with an ion meter or with an electrode specific for fluoride ions.

An electrode specific for fluoride ions can be an electrode having a membrane permeable only to fluoride ions. An example of a membrane permeable only to fluoride ions includes, but is not limited to, a europium-doped lanthanum fluoride membrane.

DESCRIPTION OF FIGURES

FIG. 1 shows a graph depicting the neutralization of 1 M NaOH and 1 M HCl with the solution from example 1.

FIG. 2 shows a graph depicting the binding of fluoride present in 5 mL of 1 M $NH_4F$ with the solution from example 1.

FIG. 3 shows a graph depicting the neutralization of 1 M NaOH and 1 M HCl with the solution from example 2.

FIG. 4 shows a graph depicting the binding of fluoride present in 5 mL of 1 M $NH_4F$ with the solution from example 2.

FIG. 5 shows a graph depicting the neutralization of 1 M NaOH and 1 M HCl with the solution from example 3.

FIG. 6 shows a graph depicting the binding of fluoride present in 5 mL of 1 M $NH_4F$ with the solution from example 3.

The invention will now be illustrated by the non-restricting examples hereinbelow.

EXAMPLES

In the examples that follow, the following commercial products are used:

- Sodium L-glutamate monohydrate sold by MB Biomedicals, LLC,
- Methyl red sold by EMD Millipore Corporation,
- Thymol blue sold by Alfa Aesar,
- L-Arginine monohydrochloride sold by Alfa Aesar,
- L-Lysine hydrochloride sold by ThermoFisher (Kandel) GmbH,
- Ethyl orange sold by Alfa Aesar,
- Bromophenol blue sold by EMD Millipore Corporation,
- Sodium hydroxide sold by VWR Chemicals,
- Sodium aluminate sold by Sigma Aldrich,
- Ethylenediaminetetraacetic acid (EDTA) sold by Merck Millipore.

Example 1

A decontamination composition 1 was prepared that comprised:

TABLE 1

| | Starting material | Percent by weight (%) |
|---|---|---|
| Neutralizing agents | Aluminum-EDTA complex having a pKa of 5.87 | 16.83 |
| | Sodium glutamate monohydrate | 8.33 |
| Color indicators | Methyl red | 0.00036 |
| | Thymol blue | 0.0019 |
| Solvent | Water | the remainder being composed of water |

The decontamination composition 1 is free of salts $H_aX_b$ as defined according to the present invention.

Neutralization Test

A neutralization test was carried out with the following liquids: 1 M sodium hydroxide (NaOH) and 1 M hydrochloric acid (HCl), using the composition prepared in example 1, according to the following procedure:

to 1 mL of 1 M sodium hydroxide (NaOH) or 1 mL of 1 M hydrochloric acid (HCl) were successively added:

1 mL, 2 mL, 3 mL, 4 mL, 5 mL, 10 mL, 20 mL, 30 mL, 40 mL and/or 50 mL of the solution from example 1, waiting a maximum of 1 minute between each addition, and the pH was measured after each addition.

The results are presented in table 2 and depicted in FIG. 1.

TABLE 2

| Volume of 'example 1' solution added to 1 mL of 1M NaOH (mL) | pH | Volume of 'example 1' solution added to 1 mL of 1M HCl (mL) | pH |
|---|---|---|---|
| 0 | 13.17 | 0 | −0.18 |
| 1 | 12.81 | 1 | 3.8 |
| 2 | 9.81 | 2 | 5.58 |
| 3 | 9.48 | 3 | 6.01 |
| 4 | 9.28 | 4 | 6.24 |
| 5 | 9.12 | 5 | 6.4 |
| 10 | 8.63 | 10 | 6.83 |
| 20 | 8.17 | 20 | 7.14 |
| 30 | 7.94 | 30 | 7.25 |
| 40 | 7.85 | 40 | 7.3 |
| 50 | 7.78 | 50 | 7.34 |

Color Test

A color test was carried out with the following liquids: 1 M sodium hydroxide (NaOH) and 1 M hydrochloric acid (HCl), using the composition prepared in example 1, according to the following procedure:

into a beaker containing 20 mL of solution from example 1 are added 10 mL of 1 M sodium hydroxide (NaOH) or of 1 M hydrochloric acid (HCl). The color is observed with the naked eye.

A variation in the color of the solution from example 1 as a function of pH is observed.

The results are presented in table 3 below.

TABLE 3

| pH | Observed color |
|---|---|
| 3 | Red |
| 7 | Yellow |
| 12 | Blue |

Binding of Fluoride Ions Test

A binding of fluoride ions test was carried out with a 1 M solution of ammonium fluoride ($NH_4F$), using the composition prepared in example 1, according to the following procedure:

to 5 mL of a 1 M solution of ammonium fluoride ($NH_4F$) were successively added 1 mL or 5 mL of the solution from example 1, waiting a maximum of 1 minute between each addition, and the concentration of free fluoride ions was measured continuously.

The fluoride ion concentration is measured with a PHM240 ion meter sold by the company Radiometer and an Orion™ brand electrode specific for fluoride ions sold by the company Thermo Scientific.

The results are depicted in FIG. 2.

Example 2

A decontamination composition 2 was prepared that comprised:

TABLE 4

| | Starting material | Percent by weight (%) |
|---|---|---|
| Neutralizing agents | Aluminum-EDTA complex having a pKa of 5.87 | 16.04 |
| | L-Arginine monohydrochloride | 12.86 |

TABLE 4-continued

| | Starting material | Percent by weight (%) |
|---|---|---|
| Color indicator | Thymol blue | 0.004 |
| Solvent | Water | the remainder being composed of water |

The decontamination composition 2 is free of salts $H_aX_b$ as defined according to the present invention.

Neutralization Test

A neutralization test was carried out according to the procedure from example 1 using the composition from example 2.

The results are presented in table 5 and depicted in FIG. 3.

TABLE 5

| Volume of 'example 2' solution added to 1 mL of 1M NaOH (mL) | pH | Volume of 'example 2' solution added to 1 mL of 1M HCl (mL) | pH |
|---|---|---|---|
| 0 | 13.52 | 0 | 0.25 |
| 1 | 9.58 | 1 | 2.48 |
| 2 | 9.03 | 2 | 3.65 |
| 3 | 8.78 | 3 | 5.12 |
| 4 | 8.65 | 4 | 5.56 |
| 5 | 8.52 | 5 | 5.78 |
| 10 | 8.19 | 10 | 6.31 |
| 15 | 8.02 | 20 | 6.68 |
| 20 | 7.9 | 30 | 6.84 |
| 30 | 776 | 40 | 6.89 |
| 40 | 7.67 | 50 | 6.95 |
| 50 | 7.59 | | |

Color Test

A color test was carried out according to the procedure from example 1 using the composition from example 2.

A variation in the color of the solution from example 2 as a function of pH is observed.

The results are presented in table 6 below.

TABLE 6

| pH | Observed color |
|---|---|
| 1 | Red |
| 7 | Orange |
| 12 | Blue |

Binding of Fluoride Ions Test

A binding of fluoride ions test was carried out according to the procedure from example 1 using the composition from example 2.

The results are depicted in FIG. 4.

Example 3

A decontamination composition 3 was prepared that comprised:

TABLE 7

| | Starting material | Percent by weight (%) |
|---|---|---|
| Neutralizing agents | Aluminum-EDTA complex having a pKa of 5.87 | 10.9 |
| | L-Lysine hydrochloride | 49.58 |

TABLE 7-continued

| | Starting material | Percent by weight (%) |
|---|---|---|
| Color indicators | Ethyl orange | 0.002 |
| | Bromophenol blue | 0.002 |
| Solvent | Water | the remainder being composed of water |

The decontamination composition 3 is free of salts $H_aX_b$ as defined according to the present invention.

Neutralization Test

A neutralization test was carried out according to the procedure from example 1 using the composition from example 3.

The results are presented in table 8 and depicted in FIG. 5.

TABLE 8

| Volume of 'example 3' solution added to 1 mL of 1M NaOH (mL) | pH | Volume of 'example 3' solution added to 1 mL of 1M HCl (mL) | pH |
|---|---|---|---|
| 0 | 13.26 | 0 | −0.17 |
| 1 | 9.33 | 1 | 2.16 |
| 2 | 8.93 | 2 | 3.04 |
| 3 | 8.73 | 3 | 3.61 |
| 4 | 8.58 | 4 | 4.32 |
| 5 | 8.48 | 5 | 5.05 |
| 10 | 8.15 | 10 | 5.93 |
| 20 | 7.84 | 20 | 6.39 |
| 30 | 7.69 | 30 | 6.58 |
| 40 | 7.52 | 40 | 6.68 |
| 50 | 7.46 | 50 | 6.74 |
| 60 | 7.4 | 60 | 6.79 |

Color Test

A color test was carried out according to the procedure from example 1 using the composition from example 3. A variation in the color of the solution from example 3 as a function of pH is observed. The results are presented in table 9 below.

Color Test

A color test was carried out according to the procedure from example 1 using the composition from example 3.

A variation in the color of the solution from example 3 as a function of pH is observed.

The results are presented in table 9 below.

TABLE 9

| pH | Observed color |
|---|---|
| 3 | Orange |
| 7 | Purple |
| 12 | Gray |

Binding of Fluoride Ions Test

A binding of fluoride ions test was carried out according to the procedure from example 1 using the composition from example 3.

The results are depicted in FIG. 6.

In conclusion, decontamination compositions 1 to 3 neutralize 1 M sodium hydroxide and 1 M hydrochloric acid by restoring the pH to between 5.5 and 9. This variation in pH is accompanied by a change in color.

Decontamination compositions 1 to 3 also make it possible to bind fluoride ions by restoring the concentration of free fluoride ions to an acceptable value, that is to say a value of less than 1.5 mg/L.

The invention claimed is:

1. A decontamination composition for a chemical containing fluoride ions, comprising:

at least one primary neutralizing agent that is a complex based on aluminum and ethylenediaminetetraacetic acid and having a pKa of >4, at least one secondary neutralizing agent, water, a color indicator or a mixture of color indicators in an amount ranging from 0.001% to 5% by weight, relative to the total weight of the composition, and optionally at least one additive, wherein said composition is free of salts $H_aX_b$ in which H is an alkali metal or alkaline earth metal, X is a halogen atom, a is an integer between 1 and 2, and b is an integer between 1 and 4, and wherein the secondary neutralizing agent is selected from the group consisting of ascorbic acid and salts thereof, hydrogen carbonate and salts thereof, creatinine, glutathione, isoguanine, adenine, amino acid and salts thereof, glutamic acid and salts thereof, aspartic acid and salts thereof, arginine and salts thereof, lysine and salts thereof, ornithine and salts thereof, cysteine, and mixtures thereof.

2. The composition as claimed in claim 1, wherein said primary neutralizing agent is present in an amount ranging from 0.1% to 25% by weight, relative to the total weight of the composition.

3. The composition as claimed in claim 1, wherein said secondary neutralizing agent is selected from the group consisting of sodium glutamate, lysine, ornithine, cysteine, and L-arginine.

4. The composition as claimed in claim 1, wherein said secondary neutralizing agent is present in an amount ranging from 0.1% to 50% by weight, relative to the total weight of the composition.

5. The composition as claimed in claim 1, wherein said color indicator or said mixture of color indicators has a color-change zone at a pH of between 1 and 7, and a color-change zone at a pH of between 8 and 13.

6. The composition as claimed in claim 5, wherein the color indicator is selected from the group consisting of methyl red, thymol blue, ethyl orange, methyl orange, tropaeolin OO, bromophenol blue, and mixtures thereof.

7. The composition as claimed in claim 1, wherein the salt $H_aX_b$ is at least one compound selected from the salt NaCl, the salt KCl, the salt NaF, and the salt NaBr.

8. The composition as claimed in claim 1, wherein the composition comprises:

from 5% to 25% of the primary neutralizing agent, from 1% to 50% of the secondary neutralizing agent, from 0.001% to 5% of the color indicator or mixture of color indicators, and water, said percentages being percentages by weight relative to the total weight of the composition.

9. A decontamination method employing the composition as defined in claim 1, comprising the following steps:

(1) dispersing the composition on a surface soiled with a chemical, (2) repeating step (1) until a neutral pH is obtained, and (3) optionally rinsing with water to prevent colored crystals from appearing during drying of the decontaminated surface.

10. The decontamination method as claimed in claim 9, wherein said chemical is a corrosive product or is a chemical containing fluoride ions.

11. A method for decontaminating materials, machines, or equipment soiled with a chemical, comprising applying the composition as defined in claim 1 to said materials, machines, or equipment soiled with a chemical.

12. The method as claimed in claim 11, wherein said chemical is a corrosive product or is a chemical containing fluoride ions.

13. The composition as claimed in claim 1, wherein said primary neutralizing agent is present in an amount ranging from 10% to 20% by weight, relative to the total weight of the composition.

14. The composition as claimed in claim 1, wherein said primary neutralizing agent is present in an amount ranging from 15% to 18% by weight, relative to the total weight of the composition.

15. The composition as claimed in claim 1, wherein said secondary neutralizing agent is present in an amount ranging from 5% to 15% by weight, relative to the total weight of the composition.

16. The composition as claimed in claim 1, wherein the composition comprises:

from 10% to 17% of the primary neutralizing agent, from 8% to 13% of the secondary neutralizing agent, from 0.002% to 0.5% of the color indicator or mixture of color indicators, and water, said percentages being percentages by weight relative to the total weight of the composition.

* * * * *